Oct. 21, 1930.  J. F. SMITH  1,779,338
RELEASABLE CLOSURE AND COLLAPSIBLE SEAT FOR AIRCRAFT
Filed April 3, 1929  3 Sheets-Sheet 1
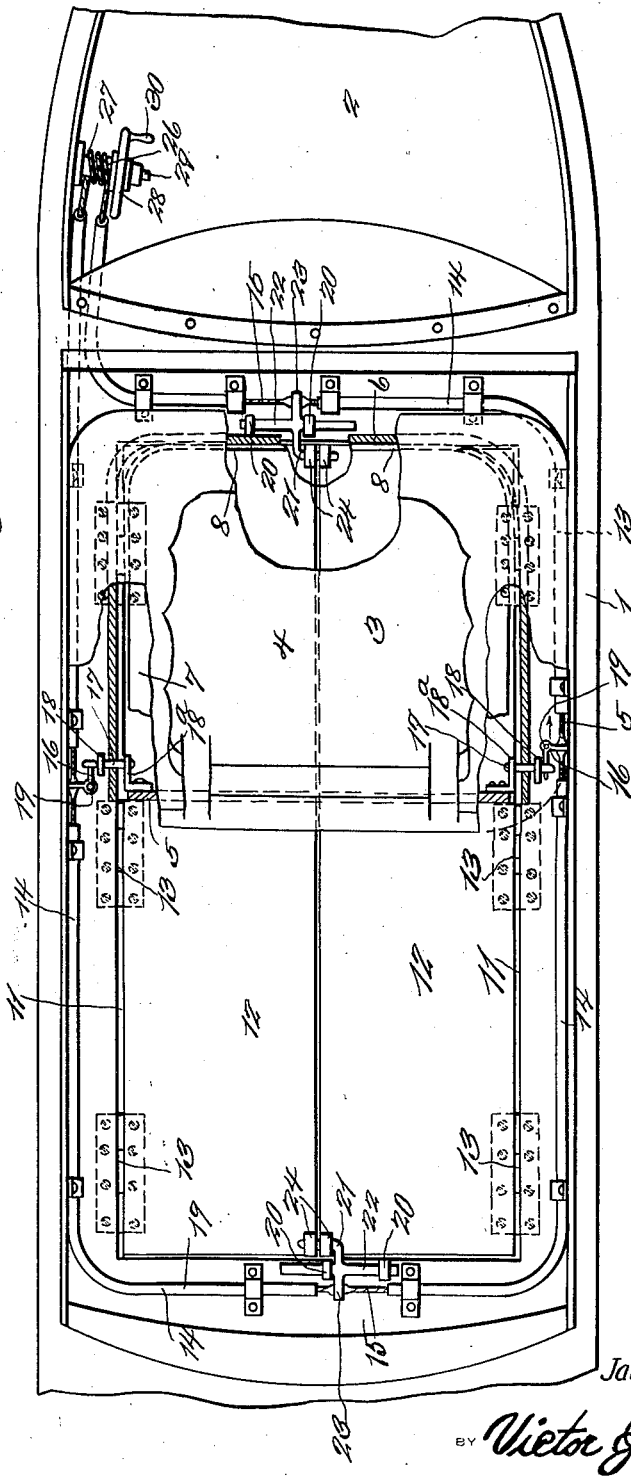
James Floyd Smith,
INVENTOR
BY Victor J. Evans
ATTORNEY Oct. 21, 1930.  J. F. SMITH  1,779,338
RELEASABLE CLOSURE AND COLLAPSIBLE SEAT FOR AIRCRAFT
Filed April 3, 1929  3 Sheets-Sheet 2
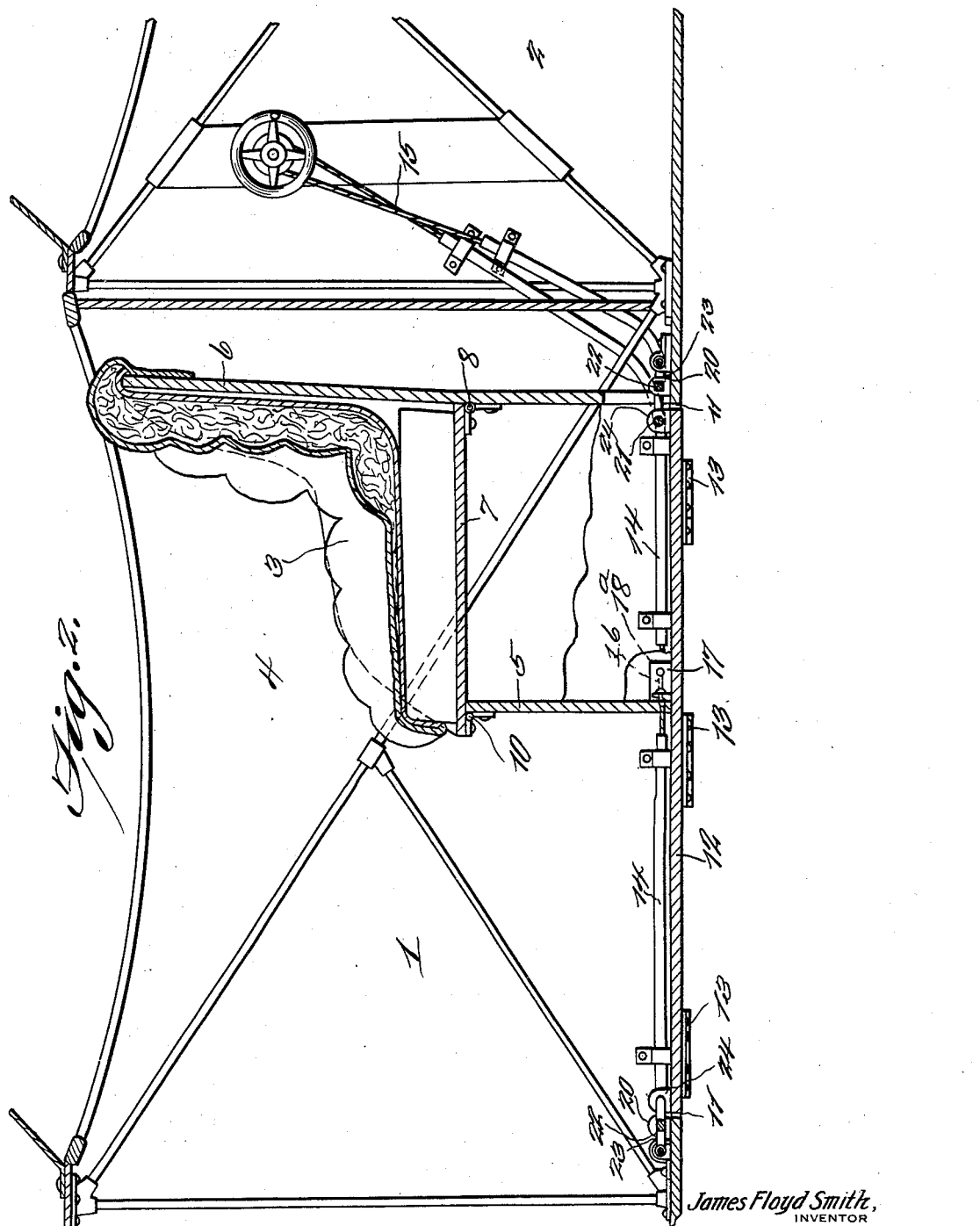
James Floyd Smith, INVENTOR
BY Victor J. Evans
his ATTORNEY Oct. 21, 1930.  J. F. SMITH  1,779,338
RELEASABLE CLOSURE AND COLLAPSIBLE SEAT FOR AIRCRAFT
Filed April 3, 1929  3 Sheets-Sheet 3
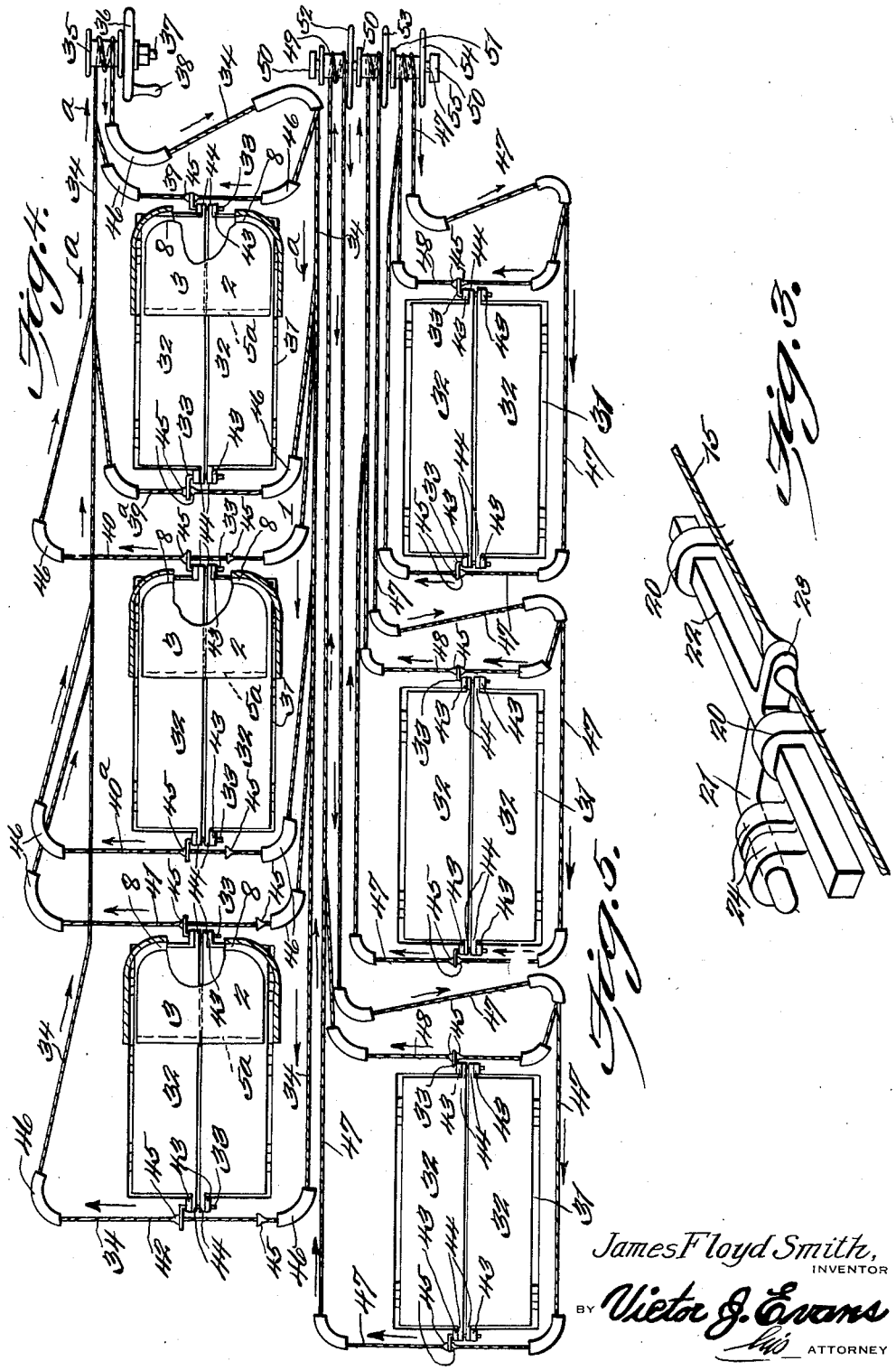
James Floyd Smith, INVENTOR
BY Victor J. Evans
ATTORNEY Patented Oct. 21, 1930

1,779,338

UNITED STATES PATENT OFFICE

JAMES FLOYD SMITH, OF TRENTON, NEW JERSEY, ASSIGNOR TO SWITLIK MANUFACTURING COMPANY, INC., OF TRENTON, NEW JERSEY, A CORPORATION OF NEW JERSEY

RELEASABLE CLOSURE AND COLLAPSIBLE SEAT FOR AIRCRAFT

Application filed April 3, 1929. Serial No. 352,226.

This invention relates to a releasable closure or trap door and operating means therefor, for use in connection with aircrafts.

The purpose if this invention is to enable passengers or crews of aircrafts to safely leave the ship, if desired, or to escape in time of danger or emergency.

It is primarily the aim to employ this device in associated connection with an especially designed trip seat, which may or may not be fitted with a parachute and harness, which may be covered and retained in place by releasable padded upholstery, which gives to the seat the appearance of a normal comfortably padded chair. In times of emergency the padded upholstery and harness disclosed in a co-pending application filed third day of April, 1929, Serial No. 352,225, may be instantly released from the seat. Should the aircraft as in Figures 4 and 5 be of a size and equipped to accommodate more than one, any number may be released from the seats substantially simultaneously or consecutively, or selectively, by means of interconnected remote control operated by one of the crew. The upholstery and harness, which is disclosed in the co-pending application may be quickly applied by the occupant of the seat or by other persons, subsequently to which one of the crew of the aircraft may operate the controls, which will release the closure or closures and seat, thereby dropping the occupant through the bottom of the aircraft, it being obvious that the occupant of any seat desired may be likewise released and dropped.

As in the co-pending application above identified a release cord is attached to a parachute and to a releasable means or fastener on the seat, and after the person has dropped the length of the release cord, the container of the parachute opens, and the parachute allowed to take the air, and which action may be assisted by the release cord, after which the person descends safely to the ground.

As in the co-pending application above identified the harness carrying the upholstery is preferably releasably locked to the seat and will automatically release from the seat when the wearer drops through the bottom, or may be released from the seat through a remote control operated by one of the crew.

Normally when the harness is applied and secured by the occupant of a seat, said harness acts as a safety belt, preventing the occupant from leaving or being thrown from the seat. The locking means for the harness is preferably associated with the locking means of the release cord, the remote control operating both simultaneously, which will permit the occupant to leave the aircraft through any other practical exit, with a free type manually operated parachute, or said release cord may be attached to a hook or eye or the like near said exit in which case the parachute would be operated automatically, should the occupant fall or jump out of the craft.

The invention has for its further purpose to provide, in a trap door releasing means, a construction, by which a number of passengers may be released consecutively one at a time, in fact almost simultaneously, or at various intervals or selectively.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is an enlarged plan view of an aircraft showing a passenger's cockpit and a pilot's cockpit and illustrating trap doors in the passenger's cockpit, with means for locking the doors, in conjunction with an actuator in the pilot's cockpit and associated with the locking means, whereby the doors may be released.

Figure 2 is an enlarged sectional view through the two cockpits, showing the doors in closed positions.

Figure 3 is a detailed view of one of the locking means for the doors.

Figure 4 is an enlarged plan view showing a plurality of seats and a plurality of trap doors, and illustrating locking means for the various doors and illustrating an actuator, whereby the seats and doors may be consecutively released.

Figure 5 is a plan view showing a multiple of trap doors and a multiple of seats with means so arranged as to provide for selectively discharging the passengers.

Referring to the drawings, 1 identifies a conventional type of airplane and 2 is the pilot's cockpit provided with the usual seat, and 4 is a cockpit for a passenger, which has a chair 3, comprising a support 5, which merges into a seat back 6, there being a seat 7 hinged at 8. The forward support 5 may be hingedly connected at 10 to the seat 7, so that when the trap doors are released, the forward support 5 will drop or collapse downwardly, allowing the passenger to easily slide off the seat and through the trap door opening.

As in a companion application, above identified, the seat 7 may support a parachute pack, which may be releasably attached to the seat, and may be carried by the passenger's padding and attached to the harness. In other words in this companion application the parachute pack, the padding and the harness may be carried by the passenger, but obviously when the passenger is occupying the chair, the padding or harness, together with the pack are releasably attached to parts of the chair.

However when it is desired to discharge a passenger through the trap door opening, the pilot releases the releasable means between the top of the chair back and the padding harness, that is from the chair, so that when the trap door or doors are released the passenger will easily slide off the seat and pass through the door opening, and when sliding off the seat, the hook of the pull or rip cord will remain engaged with a keeper on the side of the chair. Obviously the usual pull, rip or releasing cord of a parachute pack may be so attached to the airplane or fuselage thereof, so that when the passenger has descended the proper distance the pull or rip cord unwinding equal to the length of the pull cord, the parachute may open.

The bottom of the cockpit 4 has a trap door opening 11, trap doors 12 hingedly mounted therein, the hinge connections being identified at 13, so that the meeting edges of the trap doors may adjoin longitudinally centrally of the opening 11.

Conforming substantially to the contour of the door opening is a pliable tubing 14, which may be made in sections in the manner shown, and mounted in said tubing is a relatively small wire cable 15.

Arranged adjacent the longitudinal portions of the door openings 11 are bell crank levers 16, and carried by one arm of each lever is a pin or bolt 17. These bolts 17 are mounted in guides 18 and their inner ends engage in keepers or straps 18ᵃ on the forward portions of the lower ends of the support 5. The other arm of each bell crank lever 16 is attached to the cable 15. Obviously when the cable is moved, the bell crank levers 16 operate on their pivots 19, the pins or bolts 17 will extract themselves from the keepers, allowing the support 5 to be unattached, and free to swing downward with the seat 7.

Adjacent the transverse ends of the door opening 11 are guides 20, which may be separately supported on the floor of the cockpit at the ends of the opening 11. However each set of guides 20 carry a pin or bolt 22. Each pin or bolt 22, is provided with lateral arms 21 and 23, so that when the trap doors 12 are closed the arms 21 may engage through projecting ends or flanges 24, which rise from and are carried by the adjacent edges of the doors 12 at their ends, thereby retaining the doors in closed positions.

The lateral arms 23 of the bolts 22 are so positioned as to be attached to the cable, whereby when the cable is pulled in one direction, the bolts 22 may be withdrawn from the guides 21, the longitudinal adjacent edges of the trap doors then being free and the doors are then capable of swinging downward, and due to the bolts 17 having been withdrawn from the keepers on the support 5, the seat is likewise free to collapse, in which case the passanger may escape through the door opening 11.

The operation of this cable may be accomplished by the pilot, by operating an actuator, as identified at 26 at the side of the pilot seat. In a case where there are only two cock pits one for the pilot and one for the passenger, though both cock pits may have two seats (not shown) side by side, there would be only one set of trap doors, and these would be located in the bottom of the passenger's cock pit, the door opening in such an instance may be wide enough to allow the escape of both passengers. The actuator 26 comprising a drum 27, about which the cable 15 is wound and a hand wheel 28 mounted to move with the drum on a suitable stub shaft 29 projecting from the side of the pilot's cockpit. The hand wheel 28 has a lateral handle 30, and the cable is so wound on the drum that the hand wheel may be moved in one direction to operate the cable and extract the pins or bolts 17 and 22, or may be moved in the opposite direction to cause the pins or bolts to enter the keepers on the support 5 and the guides at the ends of the door opening 11.

Referring to Figure 4 there is disclosed a plurality of door openings 31 each having a set of trap door or doors 32 and in this instance the doors are held locked by pins or bolts 33, which are connected to the various cables as shown. The cables for operating the pins or bolts comprise the main cable 34, which is formed in a loop longitudinally of all of the trap doors, that is along their sides, and this cable is wound around a drum 35, which is provided with a hand wheel 36, the drum and hand wheel being mounted on a shaft 37 which may project from the side of the fuselage not shown. The hand wheel 36 has a handle 38.

Connected to the main cable 34 are the various cables 39 and 39ª, 40 and 40ª, and 41. These cables 39, 39ª, 40, 40ª and 41, and the loop 42 of the main cable 34 are connected to lateral portions of the pins or bolts 33. These bolts or pins operate through guides 43 which project from the bottom of the fuselage, not shown. The pins 33 pass through ears 44 of the various trap doors 32, thereby supporting the trap doors in closed positions. The chairs 3 in the construction in Figure 4 have supports 5ª which rest upon the trap doors and as long as the trap doors are closed the seats of the chairs 3 are supported in their proper positions.

As soon as each set of doors is released the doors collapsing downwardly, the seats are likewise collapsed downwardly.

The loop portions of the various cables 39, 39ª, 40, 40ª and 41, and the loop 42 of the main cable 34 slide through the lateral projections of the bolts or pins. Furthermore the loops of these cables have shoulders or knobs or abutments 45 thereon, which are designed to cooperate with the lateral projections of the bolts for extracting the bolts from the ears and the guides. These various loop auxiliary cables have their end spliced to the main cable 34. The abutments, knobs or the like 45 are differently disposed. For instance the abutments 45 of the two cables 39 and 39ª are immediately on both sides and in close contact with the lateral projections of the bolts or pins 33, so that as soon as the drum 35 is rotated, the main cable 34 moved in the direction of the arrows a, the bolts 33 are extracted from the projections 44 and the guides 43. By the time that the bolts 33 of the trap door to the right in Figure 4 are extracted one of the abutments or knobs 45 on the cable 40 is in the act of engaging with the lateral projection of the bolt 33 of the central set of trap doors. The abutments or knobs 45 on the two cables 40 and 40ª are spaced apart equally, so that the pins of this particular set of trap doors will be extracted from their guides at the same time.

In this manner it will be noted that the trap doors to the right are first released and allowed to swing downwardly, and then the next set of trap doors to the left are released and likewise allowed to swing downwardly.

The knobs or abutments 45 of the cable 41 and the abutments 45 on the loop 42 of the main cable are spaced a greater distance apart than the spacing of the abutments on the cables 40 and 40ª, making allowance for the amount of movement of the cable 40 and 40ª, before one of the knobs of the cable 41 and the loop 42 of the main cable is allowed to engage with projections of the bolts 33 of the third set of trap doors, in which case the third set of doors are released and allowed to swing downwardly. The various cables 39, 39ª, 40, 40ª and 41 and the loop 42 of the main cable operate through guide tubes 46 adjacent the corners of the trap doors, so that the cables may operate around the corners. To operate this construction the hand wheel 36 may be rotated either continuously and until all the doors are operated, or may be rotated intermittently, and in such an instance the pause between the movements of the hand wheel 36 may be varied so as to give passengers sufficient distance between their drops as to void any entanglement with each other. However in certain emergencies the wheel 36 may be rotated continuously, in which case the various sets of trap doors may be released almost simultaneously allowing the passengers to drop correspondingly.

Referring to Figure 5 it is to be noted that the operating cables are somewhat similar to the cables of the first set of trap doors to the right in Figure 4, each set of cables for each set of trap doors comprising a main cable 47 and a single loop cable 48, said cables being alike for each set of trap doors in Figure 5, and in this instance there are three drums 49, 50, and 51 and three hand wheels 52, 53 and 54, which are all mounted on a single shaft 55 mounted in bearings 56. Each hand wheel operates its respective drum and each main cable 47 winds around its respective drum. With this arrangement it is possible to operate any one of the drums independently of the others and thereby operate any one of the main cables independently of the others, allowing the various sets of trap doors to be released and allowed to swing downwardly selectively.

Figures 4 and 5 are what is known as diagrammatic views, not showing the exact positions of all the cables, and not showing the fuselage, but merely showing the position of the doors and the way they may be operated consecutively or selectively.

In Figure 1 the support 5 for the seat is latched at the sides of the fuselage, though it is possible that such latching means may be dispensed with, for the reason that the supports 5 rest on the trap doors, and as long as the doors are latched the seats remain supported. While Figures 4 and 5 do not show the fuselage and particularly the pilot's cock pit, it is to be understood that the pilot's cock pit will be either fore or aft of the fuselage, in which case the operating means for the latches is located remote from the doors and the seats.

While the drawings disclose trap doors for an occupant exit opening, it is obvious that a single door or closure may be employed, otherwise the construction of the latching means for the closure or door and the seat is the same or similar to that disclosed, it being further obvious that any number of closures may be used.

The invention having been set forth, what is claimed is:

1. In a device as indicated, the combination with an airship fuselage having a cockpit, the bottom of which having a door opening, of a closure or closures hingedly mounted in the opening, keepers on the closures carried by the edges at right angles to the hinged edges, sliding bolts on the bottom in position adjacent the keepers, endless means movable through guides conforming in contour to the opening and connecting with the bolts and including a rotating drum associated with the endless means for actuating the bolts in either direction to withdraw them from or insert them into the keepers.

2. The combination with an airship fuselage provided with a cabin the bottom of the cabin having a door opening, of closure or closures mounted in the opening, keepers on the closures carried by the edge thereof at right angles to the hinged edge of the closure, elements mounted on the bottom of the cabin adjacent the keepers for sliding movement into and from the keepers, a flexible endless member mounted for sliding movement on the bottom of the cabin and conforming to the contour of the opening, said endless member being connected to the sliding elements and having operating means for actuating said elements to locked and unlocked positions.

3. The combination with an airship fuselage provided with a cockpit, the bottom of which having a door opening, of a chair comprising a seat back permanently fixed to the back of the cockpit and a seat hinged to the seat back, supporting means hinged to the forward edge of the seat, a closure or closures hingedly mounted in the opening, a plurality of latch bolts operatively associated with the closure adjacent their edges at right angles to their hinged edges to latch the closure and thereby supporting the seat support, a flexible endless element operatively mounted for sliding movement in a position on the cockpit bottom and conforming to the contour of the door opening, said element operatively connecting with the latches for operating them and releasing the closure and allowing the release of the occupant of the seat, and operating means for actuating said endless element in either direction to actuate the latches.

4. The combination with an airship fuselage, the bottom of which being provided with a door opening, of a closure or closures hingedly mounted in the opening, latching means associated with the fuselage bottom and the closures adjacent the edges at right angles to the hinged edges, a flexible endless element mounted for sliding movement on the bottom and conforming to the contour of the door opening and in turn connected to the latches, a moving member operable in either direction, and with which the flexible element is so associated as to lock or unlock the latches.

5. The combination with an airship fuselage, the bottom of which having a door opening, of a closure or closures hingedly mounted in the opening, a seat hingedly mounted in the fuselage over corresponding adjacent ends of the doors, a support hingedly connected to the forward end of the seat and resting on and supported by the closures when closed, latches on the bottom adjacent the hinge edges of the closures, said latches operatively connecting with the support to latch the latter, latches on the bottom adjacent the closure edges at right angles to the hinged edges and operatively latching with the closures, a flexible endless element mounted for movement on the bottom and conforming to the contour of the door opening, said element being connected to the latches of the closures and the seat support, and a moving medium, and operable in either direction and operatively connecting with the element for operating the latter in either direction, whereby all the latches may be actuated into locked and unlocked positions for retaining the closures closed or releasing them and the seat.

6. The combination with an airship fuselage, the bottom of which being provided with a plurality of door openings, each having a closure or closures hingedly connected to opposite edges thereof, of a plurality of latch means associated with all the closures adjacent their end edges and latched therewith, and operating means comprising a plurality of elements for the closures of each opening, and means common to all latches and operatively connecting the latches and the elements, whereby the closure of each opening may be released consecutively or selectively.

7. The combination with an airship fuselage, the bottom of which being provided with a plurality of door openings, each having a closure or closures hingedly connected to opposite edges thereof, of a plurality of latch means associated with all the closures adjacent their end edges and latched therewith, and operating means comprising a plurality of elements for the closures of each opening, and means common to all latches and operatively connecting the latches and the elements, whereby the closures of each opening may be released selectively, said operating means including a single control therefor.

8. The combination with an airship fuselage, the bottom of which having a plurality of door openings, of a plurality of closures hingedly mounted in the openings, a plurality of seats hingedly mounted in the fuselage above and overlying certain corresponding adjacent ends of the doors, the forward edges of the seats having supports resting upon the trap closures, latches on the bottom adjacent the hinged edges of the closures and latchably associated with the supports, latches on the bottom and latchably associated with the ends of the closures, an operating means comprising a plurality of movable elements, one for each closure, and means operatively connected with the latches and in turn with the respective elements of the operating means, whereby each of the closures and their associated seats may be released consecutively or selectively.

9. The combination with an airship fuselage, the bottom of which having a plurality of door openings, of a plurality of closures hingedly mounted in openings, a plurality of seats hingedly mounted in the fuselage above and overlying certain corresposding adjacent ends of the closures, the forward edges of the seats having supports resting upon the closures, latches on the bottom adjacent the hinged edges of the closures and latchably associated with the supports, latches on the bottom and latchably associated with the ends of the closures, an operating means comprising a plurality of movable elements, one for each of the closures, and means operatively connected with the latches and in turn with the respective elements of the operating means, whereby each closure and its associated seat may be released selectively.

10. The combination with an airship fuselage provided with a cockpit, the bottom of which having a door opening of a chair comprising a seat back permanently fixed to the back of the cockpit and a seat hinged to the seat back, supporting means hinged to the forward edge of the seat, closures hingedly mounted in the opening, a plurality of latch bolts operatively associated with the closures adjacent their edges at right angles to their hinged edges to latch the closures and thereby supporting the seat support, latches on the bottom adjacent the hinged edges of the closures and latchably associated with the support of the seat, and means operatively connecting with both sets of latches, whereby the latter may be operated simultaneously and the closures and seat released simultaneously.

11. The combination with an airship fuselage provided with a collapsible seat, of a closure provided with latching devices at their ends mounted in the bottom of the fuselage and supporting said seats, and endless means so connected to the devices as to unlock them, said means including a single control operative by a pilot remote from the seats and closure to unlock the latching devices and release the closure.

12. The combination with an airship fuselage having a plurality of passenger seats and a pilot seat, of multiple of downwardly opening swinging trap closures in the bottom of the fuselage, each closure supporting a seat, said closures having latching means, and means operatively associated with and common to all the latching means, and being operated by a pilot remote from the seats and closures to unlock the latching means and allow the closures to open consecutively.

13. The combination with an airship fuselage having a plurality of passenger seats and a pilot seat, of a multiple of downwardly opening swinging closures in the bottom of the fuselage, each closure supporting a seat, said closures having latching means, and means operatively associated with and common to all the latching means and being operated by a pilot remote from the seats and closures to unlock the latching means and allow the closures to open consecutively and the seats collapsed downwardly likewise.

14. The combination with an aircraft fuselage provided with a cockpit or cabin, the bottom of which having an occupant exit opening, of a closure mounted to have downward swinging movement from the opening for discharging the occupant, latching devices for the ends of the closure, a collapsible seat supported by the closure, and endless means so operatively connected with the devices as to unlock and lock them, said means including a single control and operable at a point remote from the seat to unlock the devices and release the closure.

15. In a releasing closure for aircrafts, a fuselage provided with a releasable seat, the bottom of the fuselage having an exit opening for the occupant of the seat, a closure operatively mounted in the opening for downward swinging movement, and adapted when closed to support the seat, latching means for the closure including an endless element operatively associated with the latching means, and a device operatively associated with the endless element and operable at a point remote from the closure and the seat to unlock the latching means and release the closure and permit the seat to collapse.

In testimony whereof he affixes his signature.

JAMES FLOYD SMITH.